United States Patent [19]

Kinoshita et al.

[11] Patent Number: 5,116,286
[45] Date of Patent: May 26, 1992

[54] POWER TRANSMISSION BELT

[75] Inventors: Takashi Kinoshita, Takasago; Masayoshi Nakajima, Motoyamaminami; Kazuhiro Takeda, Hyogo, all of Japan

[73] Assignee: Mitsuboshi Belting Ltd., Japan

[21] Appl. No.: 615,026

[22] Filed: Nov. 16, 1990

[30] Foreign Application Priority Data

Nov. 17, 1989 [JP] Japan ................... 1-300010

[51] Int. Cl.⁵ .............................................. F16G 1/10
[52] U.S. Cl. .................................. 474/237; 474/260; 474/263
[58] Field of Search ....................... 474/260–265, 474/268, 270, 271, 237; 156/137–142

[56] References Cited

U.S. PATENT DOCUMENTS

| 4,522,614 | 6/1985 | Matsuoka et al. | 474/260 |
| 4,710,155 | 12/1987 | Matsuoka et al. | 474/260 |
| 4,721,496 | 1/1988 | Yokoyama et al. | 474/263 X |

*Primary Examiner*—Thuy M. Bui
*Attorney, Agent, or Firm*—Wood, Phillips, VanSanten, Hoffman & Ertel

[57] ABSTRACT

An improved cord for use in a power transmission belt. Before an adhesive stretching thermal fixation treatment, the cord, upon being heated, has a ratio of shrinkage percentage to shrinkage stress of less than 12% per g/d. After an adhesive stretching thermal fixation treatment, the heated cord has a ratio of shrinkage percentage to shrinkage stress of less than 6% per g/d.

27 Claims, 1 Drawing Sheet

POWER TRANSMISSION BELT

BACKGROUND OF THE INVENTION

1. Field of the Invention

This invention relates to power transmission belts and, more particularly, to a power transmission belt having an improved load-carrying section that accounts for a dimensionally stable belt which elongates minimally during operation and has a high power transmission capability.

2. Background Art

The load-carrying section of a power transmission belt significantly affects the transmission capabilities of the belt, the flex fatigue, dimensional stability over time, as well as other critical belt properties.

Designers of power transmission belts have, over the years, dealt with two competing objectives—that of maintaining dimensional stability over the life of the belt and minimizing belt elongation during operation By increasing the dimensional stability of the belt over its life, the problem of belt elongation is aggravated. Conversely, alleviating the problem of belt elongation produces a dimensionally unstable belt.

In dealing with the above two objectives, belt designers have concentrated on the load-carrying section and, more commonly, on one or more longitudinal cords in the load-carrying section It is known in the prior art to fabricate a power transmission belt cord from a high strength polyester fiber Polyester fibers exhibit excellent mechanical and thermal properties that make them particularly suitable for the belt environment. In constructing cords with the polyester fibers, typically a plurality of the fibers are twisted about themselves into yarn bundles, which are in turn twisted into an untreated cord. The cord is subjected to an adhesive treatment and subsequent stretching thermal fixation treatment to produce a treated cord which is then integrated into a rubber layer under a predetermined tension and vulcanized to produce a load-carrying section.

Shrinkage percentage tends to rise as the shrinkage stress of the treated and dry heated cord is increased during the stretching thermal fixation treatment. While the stretching thermal fixation treatment of cords at high temperatures minimizes elongation of the belt during operation, it also reduces the dimensional stability of the belt over time. Heretofore, known manufacturing techniques for power transmission belts have been generally ineffective in making load-carrying section cords and belts therefrom with a high thermal shrinkage stress and a small percentage of dimensional shrinkage during the belt life.

Several attempts have been made in the prior art to overcome the above problems. For example, in Japanese Patent Examined Publication No. 50578/1980, a method of belt manufacture is disclosed in which a polyester fiber cord is thermally stretched through multiple stretching steps at a stretching ratio of at least 5%. The transmission efficiency is increased by thermal shrinkage due to frictional heat generated by belt slippage during operation.

Japanese Laid-Open Publication No. 231044/1985 discloses a method of improving the resistance to flex fatigue and dimensional stability of a belt by constructing the load-carrying section using rapidly spun polyester filament. The filament has at least 85 mol % content ethylene terephthalate as the repeating unit with an ultimate viscosity of at least 0.8%, less than a 0.19% birefringence rate, less than 60 degrees of orientation of the amorphous portion and the terminal carboxyl group content is less than 15 equivalence/$10^6$ g.

SUMMARY OF THE INVENTION

The present invention is specifically directed to overcoming the above enumerated problems in a novel and simple manner.

According to the invention, an improved cord is provided for use in the load-carrying section of a power transmission belt Before an adhesive stretching thermal fixation treatment, the cord, upon being heated, has a ratio of shrinkage percentage to shrinkage stress of less than 12% per g/d. After an adhesive stretching thermal fixation treatment, the heated cord has a ratio of shrinkage percentage to shrinkage stress of less than 6% per g/d.

In a preferred form, the belt cord is made from polyester fiber Polyester exhibits characteristics that are highly desirable in the belt environment The principal objective of the present invention is to provide a power transmission belt which elongates minimally during operation, is dimensionally stable over the life of the belt and, at the same time, exploits the desirable yarn properties of the polyester fiber making up the cords.

Through extensive testing of untreated cords, treated cords, and belts, it was found by the inventors herein that the cords exhibiting the above characteristics, before and after adhesive stretching and thermal fixation treatment, accounted for a belt with excellent and improved operating characteristics over known prior art belts.

In a preferred form, the cord is defined by a plurality of twisted polyester fibers The fibers are twisted together into discrete yarn bundles which are in turn twisted together to define the cord.

In a preferred form, the cord has a total denier of 5,000 to 60,000.

The load-carrying section is contemplated to be combined with tension and compression sections to produce a power transmission belt. The belt can be a V-belt, V-ribbed belt, flat belt, or other type of friction transmission belt.

In one preferred form, the belt has a cloth layer on at least one of the inner and outer ends thereof. The cloth is preferably a rubber cloth made at least partially from one of natural fiber and synthetic fiber yarns.

In a preferred belt construction, the compression section has a plurality of discrete elongate fibers embedded therein and extending generally in a lateral direction.

In a preferred form, the cord fibers have an ultimate viscosity of between 0.75 and 0.95 and are between 5.5 and 9 g/d in strength. In a preferred form, the shrinkage percentage for the untreated fibers is 2% to 10% when dry heated at approximately 150° for approximately 30 minutes. The shrinkage stress for the untreated fibers is 0.1 to 0.6 g/d when the fibers are dry heated at approximately 150° C. for approximately 8 minutes.

In a preferred form of adhesive stretching thermal fixation treatment, the cord is pretreated with one of an isocyanate and epoxy system. An adhesive made up of an RFL solution is applied to the cord. After the adhesive is applied to the cord, the cord is stretched by −1 to 2% at 200° to 250° C. for 30 to 600 seconds.

After adhesive stretching thermal fixation treatment, the shrinkage percentage for the cord, upon being heated at approximately 150° C. for approximately 30 minutes, is between 0.5% and 0.6%. After adhesive stretching thermal fixation treatment the shrinkage stress for the cord, upon being heated at approximately 150° C. for approximately 8 minutes for the cord is 0.1 to 0.7 g/d.

The present invention also contemplates an improved transmission belt with the belt, upon being heated at approximately 100° C. for approximately 100 hours, having a shrinkage percentage of 0.5% to 4%. The shrinkage stress for the belt, upon being heated at approximately 100° C. for approximately 30 minutes, is between 0.2 to 0.7 g/d.

DETAILED DESCRIPTION OF THE DRAWINGS

Figure 1:
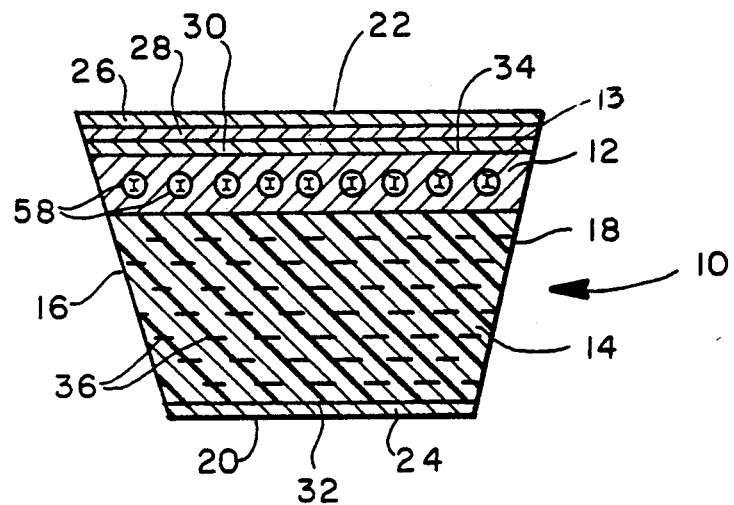
FIG. 1 is a cross sectional view of one type of power transmission belt made according to the present invention.

In FIG. 1, a V-belt is shown at 10 made in accordance with the present invention. The V-belt construction is exemplary of one type of belt suitable for incorporation of the present invention. The invention can be practiced with any frictional transmission belt and is particularly desirable where high power transmission is required with little permissible belt elongation. The V-belt 10 consists of a rubber load-carrying section 12, an outer tension section 13, and a rubber compression section 14 which cooperatively define side edges 16, 18, to be engaged with operating pulleys (not shown). The belt 10 has inner and outer edges 20, 22, respectively, defined by rubber cloth layers 24, 26. Between the cloth layer 26 and the load-carrying section 12 are two additional cloth layers 28, 30. A single cloth layer 24 is adhered to the inner surface 32 of the compression section 14. The three layers 26, 28, 30 in the tension section 13 are placed one against the other and attached to the outer surface 34 of the load-carrying section 12. Preferably, the cloth in the layers 24, 26, 28, 30 is a rubber cloth made with natural fiber or synthetic fiber yarns.

The compression section 14 has dispersed randomly therein a plurality of fibers 36 which are aligned generally in a lateral direction.

The invention resides principally in the load-carrying section 12 of the belt 10. The remainder of the belt structure shown in FIG. 1 should not be viewed as limiting of the invention as numerous other belt constructions are contemplated. For example, a cloth layer could be wrapped around the entire periphery of the belt.

Figure 2:
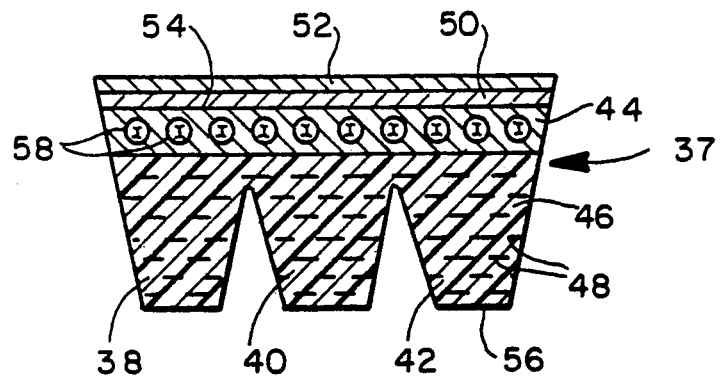
FIG. 2 is a cross sectional view of a modified type of power transmission belt made according to the present invention.

An alternative V-belt, according to the present invention, is shown in FIG. 2 at 37 with a plurality of longitudinally extending ribs 38, 40, 42. The belt 37 has a corresponding load-carrying section 44 and a compression section 46, with fibers 48 randomly distributed in the latter as in the belt 10 in FIG. 1. Two cloth layers 50, 52 are located at the outer surface 54 of the load-carrying section 44. The inner surface 56 of the compression section 46/ribs 38, 40, 42 remains uncovered by cloth.

Cords 58 are provided in each load-carrying section 12, 44 and are formed from polyester. Polyester has excellent mechanical and thermal properties making it particularly suitable for power transmission belts. Each cord 58 consists of a plurality of high strength polyester fibers twisted into a yarn bundle, with a plurality of yarn bundles in turn twisted about themselves to define the cord. In a preferred form, the fibers have an ultimate viscosity of 0.75 to 0.95; a strength of 5.5 to 9 g/d in strength; 7% to 15% in elongation, 2% to 10% in shrinkage percentage when heated at 150° C. for 30 minutes (i.e. dry heated); and 0.1 to 0.6 g/d in shrinkage stress when heated at 150° C. for 8 minutes (i.e. dry heated). Each cord preferably has a denier of 5,000 to 60,000.

Once the untreated cords are formed, they are subjected to stretching thermal fixation treatment This treatment, in a preferred form, is a four step process. First, the cords 58 are immersed in a supply of adhesive of isocyanate or epoxy. The cords coated with adhesive are then dried in a furnace set at 160° to 200° C. without tension on the cords for 30 to 600 seconds. After drying, the cords 58 are immersed in an adhesive made up of an RFL solution. The cords 58 are then stretched by $-1\%$ to 2% by a stretching thermal fixation treatment machine at a temperature of between 200° to 250° C. for 30 to 600 seconds. It is preferable that the elongation ratio is $-1\%$ to 2% and preferably the cords 58 are shrunk during the process.

The physical properties of the cords before and after treatment are as follows:

|  | Untreated Cord | Treated Cord |
|---|---|---|
| 1. Total Denier | 5,000 to 60,000 | |
| 2. Twist coefficient: | | |
|   First twist: | 1.5 to 4.0 | |
|   Final twist: | 1.5 to 4.0 | |
| Twist coefficient = 0.0348 × coefficient (number of twists/cm) × √total denier number | | |
| 3. Shrinkage percentage under dry heating (150° C., 30 minutes): | 2.0 to 10.0% | 0.5 to 6.0% |
| 4. Shrinkage stress under dry heating (150° C., 8 minutes): | 0.10 to 0.60 g/d | 0.10 to 0.70 g/d |

Through extensive testing, the inventors herein have found that optimum belt performance is realized by keeping the ratio of shrinkage percentage to shrinkage stress for the untreated and dry heated cords less than 12% per g/d. The same ratio for the treated and dry heated cords is to be less than 6% per g/d. It has been found that the best balance between minimizing elongation of the belt during operation and dimensional stability over the life of the belt is realized by belts with load-carrying section cords made according to the above. If the ratio for the untreated cord is more than 12%/g/d, the desired combination of elongation limitation and dimensional stability will not be realized.

The present invention contemplates a belt made with cords according to the above description, which belt exhibits the following properties:

1. Belt shrinkage percentage under dry heating (100° C., 100 hours): 0.5% to 4.0%;

2. Belt shrinkage stress under dry heating (100° C., 30 minutes): 0.20 to 0.70 g/d; and 3. Ratio of belt shrinkage percentage at dry heating to belt shrinkage stress at dry heating: less than 3.0.

The invention is described in greater detail with respect to the following example.

performance of the belt was then evaluated, with those results summarized in Table 3 below.

TABLE 3

| | | | (Belt Performance) | | | | | |
|---|---|---|---|---|---|---|---|---|
| Sample number | Type of polyester | Denier number (d) | Belt shrinkage percentage under dry heating (%) | Belt shrinkage stress (g/d) | Ratio (%/g/d/) | Time-related shrinkage percentage (%) | Belt elongation at running (%) | Result |
| Inventive Example | | | | | | | | |
| 1 | A | 6,600 | 1.08 | 0.44 | 2.5 | 0.14 | 0.06 | ○ |
| 2 | A | 6,600 | 1.19 | 0.47 | 2.5 | 0.16 | 0.06 | ○ |
| 3 | A | 6,600 | 1.01 | 0.37 | 2.7 | 0.13 | 0.08 | ○ |
| 4 | A | 6,600 | 1.09 | 0.40 | 2.7 | 0.16 | 0.09 | ○ |
| 5 | A | 6,600 | 1.17 | 0.42 | 2.8 | 0.16 | 0.09 | ○ |
| Comparative Example | | | | | | | | |
| 6 | B | 6,000 | 1.75 | 0.47 | 3.7 | 0.34 | 0.08 | X |
| 7 | B | 6,000 | 1.83 | 0.53 | 3.5 | 0.31 | 0.09 | X |
| 8 | C | 6,000 | 1.72 | 0.53 | 3.2 | 0.36 | 0.12 | X |
| 9 | D | 6,600 | 1.44 | 0.43 | 3.3 | 0.22 | 0.09 | X |
| 10 | D | 6,600 | 1.56 | 0.47 | 3.3 | 0.27 | 0.11 | X |

EXAMPLE

Polyester filaments (1000 d, 1100 d) were twisted with a first twist coefficient of 3 and a final twist coefficient of 3 into an untreated cord of 2×3 composition with a total denier of 6,000 and 6,600. Table 1 shows the physical properties of the untreated cord.

TABLE I

| | (Physical Properties of Untreated Cord) | | | | | |
|---|---|---|---|---|---|---|
| Sample number | Type of polyester | Denier number (d) | Shrinkage percentage under dry heating | Shrinkage stress (g/d) | Ratio (% g/d) | Result |
| 1 | A | 6,600 | 5.2 | 0.47 | 11.1 | ○ |
| 2 | B | 6,000 | 2.7 | 0.25 | 10.8 | ○ |
| 3 | C | 6,000 | 6.6 | 0.52 | 12.7 | X |
| 4 | D | 6,600 | 6.8 | 0.20 | 34.0 | X |

Each untreated cord was: initially immersed in an adhesive of isocyanate; dried at a temperature of about 180–190° C.; thereafter immersed in a resorcinol-formalin-latex (RFL) solution; and then subjected to a stretching thermal fixation treatment under conditions described in the following Table 2. The treatment time was approximately 120 seconds.

The testing technique for the polyester cords and belts was as described below:

1. SHRINKAGE PERCENTAGE UNDER DRY HEATING

This value was determined after the belt sample was left at an atmospheric temperature of 150° C. for thirty minutes in accordance with JIS L-1017 (1983).

2. SHRINKAGE STRESS AT DRY HEATING

The stress produced after the belt sample was left at an atmospheric temperature of 150° C. under an initial load of 0.25 g/d for eight minutes was determined.

TABLE 2

| | | | (Physical Properties of Treated Cord) | | | | | |
|---|---|---|---|---|---|---|---|---|
| Sample number | Type of polyester | Denier number (d) | Treatment conditions; Temperature (°C.) | Elongation (%) | Shrinkage percentage under dry heating (%) | Shrink stress (g/d) | Ratio (%/g/d) | Result |
| Inventive Example | | | | | | | | |
| 1 | A | 6,600 | 230 | 0 | 1.9 | 0.35 | 5.5 | ○ |
| 2 | A | 6,600 | 230 | 0 | 2.2 | 0.42 | 5.2 | ○ |
| 3 | A | 6,600 | 230 | 0 | 1.9 | 0.33 | 5.7 | ○ |
| 4 | A | 6,600 | 230 | 0 | 1.9 | 0.33 | 5.7 | ○ |
| 5 | A | 6,600 | 230 | −1 | 1.3 | 0.23 | 5.7 | ○ |
| Comparative Example | | | | | | | | |
| 6 | B | 6,000 | 230 | 1 | 2.0 | 0.32 | 6.3 | X |
| 7 | B | 6,000 | 230 | 2 | 2.4 | 0.39 | 6.1 | X |
| 8 | C | 6,000 | 230 | 3 | 3.2 | 0.54 | 5.9 | ○ |
| 9 | D | 6,600 | 230 | 5 | 3.5 | 0.42 | 8.3 | X |
| 10 | D | 6,600 | 230 | 5 | 3.8 | 0.40 | 9.5 | X |

The treated cords were then used to prepare raw edge V-belts of the type shown in FIG. 1 with a size of 970 mm in length (A type). The static and dynamic

3. BELT SHRINKAGE PERCENTAGE UNDER DRY HEATING

The ratio of length variation in the outer circumference of the belt i.e. the shrink percentage, was determined after the belt sample was left at an atmospheric temperature of 100° C. for 100 hours.

4. BELT SHRINKAGE STRESS UNDER DRY HEATING

The stress produced after the belt sample was left at an atmospheric temperature of 100° C. under an initial load of 0.5 g/d for thirty minutes was determined.

5. TIME-RELATED BELT SHRINKAGE PERCENTAGE

The ratio of length variation in the outer circumference of the belt, i.e. shrinkage percentage, was determined after the belt sample was left at an atmospheric temperature of 40° C. for 100 days.

6. BELT ELONGATION AT RUNNING

The belt sample, which was 975 mm in length, was applied to a tester, equipped with a driving pulley having a diameter of 60 mm and an idler pulley of a diameter of 45 mm. At a load of 45 kg applied on the idler shaft, the driving pulley was rotated at 3600 rpm. The ratio of length variation in the belt outer circumference was determined 500 hours later.

From the above test results, it can be seen that belts having a polyester cord in the load-carrying section thereof, satisfying the requirements that the ratio of shrinkage percentage to shrinkage stress for the dry heated cord be less than 12%/g/d before an adhesive stretching fixation treatment and less than 6%/g/d after an adhesive stretching fixation treatment, were superior in terms of time related shrinkage percentage and minimized elongation during operation.

It was also found that subjecting an untreated cord which has less than 12%/g/d in the ratio of shrinkage percentage to shrinkage stress, when dry heated, to a stretching thermal fixation treatment under conditions of a 200°-250° C. treating temperature and −1% to 0% elongation produced the desired cord.

The foregoing disclosure of specific embodiments is intended to be illustrative of the broad concepts comprehended by the invention.

We claim:

1. An improved cord for use in a load carrying section of a power transmission belt, the improvement comprising:
   a) said cord upon being heated having a ratio of shrinkage percentage to shrinkage stress before an adhesive stretching thermal fixation treatment of less than 12.0%/g/d; and
   b) said cord upon being heated having a ratio of shrinkage percentage to shrinkage stress after an adhesive stretching thermal fixation of less than 6.0%/g/d,
   said cord, when incorporated into a load carrying section of a power transmission belt, minimizing elongation of the belt during operation while maximizing dimensional stability over the life of the belt.

2. The improved power transmission belt cord according to claim 1 wherein the ratio of shrinkage percentage to shrinkage stress for the cord before an adhesive stretching thermal fixation treatment is determined after dry heating the cord at between 160° to 200° C. for 30–600 seconds.

3. The improved power transmission belt cord according to claim 1 wherein the adhesive stretching thermal fixation treatment comprises the step of dry heating the cord at 200° C. to 250° C. for between 30 to 600 seconds while being stretched −1% to 2%.

4. The improved power transmission belt cord according to claim 1 wherein said cord is made from polyester.

5. The improved power transmission belt cord according to claim 4 wherein the cord is defined by a plurality of twisted fibers.

6. The improved power transmission belt cord according to claim 5 wherein the fibers have an ultimate viscosity of between 0.75 and 0.95.

7. The improved power transmission belt cord according to claim 5 wherein the fibers are between 5.5 and 9.0 g/d in strength.

8. The improved power transmission belt cord according to claim 4 wherein the cord is defined by a plurality of fibers twisted together into discrete yarn bundles with a plurality of said bundles being in turn twisted together to define said cord.

9. The improved power transmission belt cord according to claim 4 wherein the cord has a total denier of 5,000 to 60,000.

10. The improved power transmission belt cord according to claim 1 wherein said cord is embedded in rubber to define at least part of a load-carrying section of a power transmission belt.

11. The improved power transmission belt cord according to claim 10 in combination with a compression section and tension section, thereby defining a power transmission belt.

12. The power transmission belt according to claim 11 wherein the power transmission belt is a V-belt.

13. The power transmission belt according to claim 11 wherein the power transmission belt is a V-ribbed belt.

14. The power transmission belt according to claim 11 wherein the power transmission belt has inner and outer ends and there is a cloth layer on at least one of the inner and outer ends of the power transmission belt.

15. The improved power transmission belt cord according to claim 14 wherein the cloth layer is a rubber cloth made at least partially from one of natural fiber and synthetic fiber yarns.

16. The power transmission belt according to claim 11 wherein the belt has a lateral extent and the compression section has a plurality of elongate fibers embedded therein and extending generally in a lateral direction.

17. The improved power transmission belt cord according to claim 10 wherein the cord is pretreated prior to adhesive stretching thermal fixation treatment with one of an isocyanate and epoxy system.

18. The improved power transmission belt cord according to claim 17 wherein in the adhesive stretching thermal fixation treatment an adhesive made up of an RFL solution is applied to the cord.

19. The improved power transmission belt cord according to claim 18 wherein in the adhesive stretching thermal fixation treatment of the cord, after the adhesive is applied to the cord, the cord is stretched by −1% to 2% at 200°-250° C. for 30-600 seconds.

20. The improved power transmission belt cord according to claim 1 wherein after adhesive stretching thermal fixation treatment the shrinkage percentage of the cord dry heated at approximately 150° C. for approximately 30 minutes is 0.5% to 6%.

21. The improved power transmission belt cord according to claim 1 wherein after adhesive stretching thermal fixation treatment the shrinkage stress of the cord dry heated at approximately 150° C. for approximately 8 minutes is 0.1 to 0.7 g/d.

22. The improved power transmission belt cord according to claim 1 wherein before adhesive stretching thermal fixation treatment the shrinkage percentage for the cord dry heated at approximately 150° C. for approximately 30 minutes is 2% to 10%.

23. The improved power transmission belt cord according to claim 1 wherein before adhesive stretching thermal fixation treatment the shrinkage stress for the cord dry heated at approximately 150° C. for approximately 8 minutes is 0.1 to 0.6 g/d.

24. An improved power transmission belt, the improvement comprising:
   a) said power transmission belt after heating at approximately 100° C. for approximately 100 hours having a shrinkage percentage of 0.5% to 4%;
   b) said power transmission belt after heating at approximately 100° C. for approximately 30 minutes having a shrinkage stress of 0.2-0.7 g/d; and
   c) said power transmission belt after heating according to a) and b) having a ratio of belt shrinkage percentage to belt shrinkage stress of less than 3,
   said power transmission belt having minimal elongation during operation while exhibiting excellent dimensional stability.

25. The improved power transmission belt according to claim 24 wherein said power transmission belt has a tension section, a load carrying section and a compression section and there is a cord in the load-carrying section, the ratio of shrinkage percentage to shrinkage stress for the cord before an adhesive stretching thermal fixation treatment after heating the cord at between 160° C. to 200° C. for 30-600 seconds is less than 12.0%/g/d and the ratio of shrinkage percentage to shrinkage stress after an adhesive stretching thermal fixation is less than 6.0%/g/d.

26. The improved power transmission belt according to claim 24 wherein the cord is made from polyester.

27. The improved power transmission belt according to claim 24 wherein the thermal fixation treatment comprises the steps of dipping the cord in an adhesive that is one of an isocyanate system and an epoxy system, drying the adhesive, coating the cord in an adhesive made up of an RFL solution, and stretching the cord by −1% to 2% at 200°-250° C. for 30 to 600 seconds.

* * * * *